(12) United States Patent
Sullivan

(10) Patent No.: US 6,394,914 B1
(45) Date of Patent: *May 28, 2002

(54) GOLF BALL WITH COVER HAVING AT LEAST THREE LAYERS

(75) Inventor: Michael J. Sullivan, Chicopee, MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/686,772

(22) Filed: Oct. 11, 2000

Related U.S. Application Data

(60) Division of application No. 09/467,478, filed on Dec. 20, 1999, now Pat. No. 6,152,834, which is a division of application No. 09/008,802, filed on Jan. 20, 1998, now Pat. No. 6,117,025, which is a continuation-in-part of application No. 08/490,963, filed on Jun. 15, 1995, now Pat. No. 6,042,488, and a continuation-in-part of application No. 08/495,062, filed on Jun. 26, 1995, now Pat. No. 5,830,087

(60) Provisional application No. 60/042,119, filed on Mar. 28, 1997.

(51) Int. Cl.$^7$ ............................................... A63B 37/06
(52) U.S. Cl. ......................................... 473/376; 473/377
(58) Field of Search ................................ 473/373, 374, 473/377, 378, 371, 361, 376, 354

(56) References Cited

U.S. PATENT DOCUMENTS

| | | | | |
|---|---|---|---|---|
| 5,730,665 A | * | 3/1998 | Shimosaka et al. | 473/376 |
| 5,816,937 A | * | 10/1998 | Shimosaka et al. | 473/354 |
| 6,117,025 A | * | 9/2000 | Sullivan | 473/373 |
| 6,152,834 A | * | 11/2000 | Sullivan | 473/365 |

* cited by examiner

*Primary Examiner*—Mark S. Graham
*Assistant Examiner*—Raeann Gorden

(57) ABSTRACT

Disclosed herein is a golf ball with a multi-layer cover. The golf ball has a core, an inner cover layer, an intermediate cover layer, and an outer cover layer, each cover layer having a different hardness than each adjacent cover layer. The sum of the thickness of the inner cover layer, intermediate cover layer and outer cover layer is 0.05–0.50 inches. A method for making the golf ball also is disclosed.

9 Claims, 2 Drawing Sheets

GOLF BALL WITH COVER HAVING AT LEAST THREE LAYERS

RELATED APPLICATIONS

This application is a division of U.S. application Ser. No. 09/467,478 filed Dec. 20, 1999 now U.S. Pat. No. 6,152,834 which, in turn, is a division of U.S. application Ser. No. 09/008,802 filed Jan. 20, 1998 now U.S. Pat. No. 6,117,025 which, in turn, is a continuation-in-part of U.S. application Ser. No. 08/490,963 filed Jun. 15, 1995 now U.S. Pat. No. 6,042,488, U.S. application Ser. No. 08/495,062 filed Jun. 26, 1995 now U.S. Pat. No. 5,830,087 and Provisional U.S. Application No. 60/042,119 filed Mar. 28, 1997. The disclosures of each of the above referenced applications is incorporated by reference herein.

FIELD OF THE INVENTION

The present invention generally relates to golf balls, and more particularly to a golf ball having a cover which includes at least three layers.

BACKGROUND OF THE INVENTION

Golf balls traditionally have been categorized in three different groups, namely as one-piece, two-piece and three-piece balls. Conventional two-piece golf balls include a solid resilient core having a cover of a different type of material molded thereon. Three-piece golf balls traditionally have included a liquid or solid center, elastomeric winding around the center, and a molded cover. Solid cores of both two and three-piece balls often are made of polybutadiene and the molded covers generally are made of natural balata, synthetic balata, or ionomeric resins.

Ionomeric resins are polymers containing interchain ionic bonding. As a result of their toughness, durability and flight characteristics, various Monomeric resins sold by E.I. DuPont de Nemours & Company under the trademark "Surlyn®" and by the Exxon Corporation (see U.S. Pat. No. 4,911,451) under the trademark "Escor®" and the trade name "Iotek", have become the materials of choice for the construction of golf ball covers over the traditional "balata" (transpolyisoprene, natural or synthetic) rubbers. The softer balata covers, although exhibiting enhanced playability properties, lack the durability (cut and abrasion resistance, fatigue endurance, etc.) properties required for repetitive play.

Ionomeric resins are generally ionic copolymers of an olefin, such as ethylene, and a metal salt of an unsaturated carboxylic acid, such as acrylic acid, methacrylic acid or maleic acid. Metal ions, such as sodium or zinc, are used to neutralize some portion of the acidic group in the copolymer, resulting in a thermoplastic elastomer exhibiting enhanced properties, i.e., durability, etc., for golf ball cover construction over balata.

While there are currently more than fifty (50) commercial grades of ionomers available from Exxon and DuPont, with a wide range of properties which vary according to the type and amount of metal cations, molecular weight, composition of the base resin (i.e., relative content of ethylene and methacrylic and/or acrylic acid groups) and additive ingredients such as reinforcement agents, etc., a great deal of research continues in order to develop a golf ball cover composition exhibiting the desired combination of playability properties.

Golf balls are typically described in terms of their size, weight, composition, dimple pattern, compression, hardness, durability, spin rate, and coefficient of restitution (COR). One way to measure the COR of a golf ball is to propel the ball at a given speed against a hard massive surface, and to measure its incoming and outgoing velocity. The COR is the ratio of the outgoing velocity to the incoming velocity and is expressed as a decimal between zero and one.

There is no United States Golf Association limit on the COR of a golf ball but the initial velocity of the golf ball must not exceed 250±5 ft/second. As a result, the industry goal for initial velocity is 255 ft/second, and the industry strives to maximize the COR without violating this limit.

U.S. Pat. Nos. 4,431,193 and 4,919,434 disclose golf balls with multi-layer covers. U.S. Pat. No. 4,431,193 discloses a multi-layer ball with a hard inner cover layer and a soft outer cover layer. U.S. Pat. No. 4,919,434 discloses a golf ball with a 0.4–2.2 mm thick cover made from two thermoplastic cover layers. U.S. Pat. No. 5,273,286 discloses a golf ball with a multi-layer core. The golf ball disclosed therein has an inner core, a shell surrounding the inner core, an outer core, and a cover.

SUMMARY OF THE INVENTION

An object of the invention is to provide a golf ball for a low handicap player which has a favorable combination of spin and feel.

Another object of the invention is to provide a golf ball for a high handicap player which-has a favorable combination of spin and feel.

A further object of the invention is to provide a method of making multi-layer golf balls in which the characteristics-of spin and feel can be carefully controlled to result in a desired combination of these properties.

Other objects of the invention will be in part obvious and in part pointed out more in detail hereinafter.

A preferred form of the invention is a golf ball comprising a solid or wound core, an inner cover layer formed around the core, an intermediate cover layer formed around the inner cover layer, and an outer cover layer formed around the intermediate cover layer, each cover layer having a different. Shore D hardness than each adjacent cover layer. The outer cover layer preferably comprises ionomer.

The invention in another preferred form is a golf ball comprising a solid or wound core, an inner cover layer formed around the core, the inner cover layer having a Shore D hardness of at least 62, preferably in the range of 62–90, an intermediate cover layer formed around the inner cover layer, and an outer cover layer formed around the intermediate cover layer, each cover layer having a different Shore D hardness than each adjacent cover layer.

In a particularly preferred form of the invention, the intermediate cover layer is softer than the inner and outer cover layers. In another embodiment, the intermediate cover layer is harder than the outer cover layer and softer than the inner cover layer. In yet another embodiment, the intermediate cover layer is softer than the outer cover layer and harder than the inner cover layer. In a fourth embodiment, the intermediate cover layer is harder than the inner and outer cover layers. Each of the inner, intermediate and outer cover layers preferably has a thickness of 0.01–0.20 inches,- and more preferably 0.025–0.15 inches.

The outer cover layer preferably comprises ionomer. The inner and intermediate cover layers preferably are thermoplastic. In particularly preferred forms of the invention, the inner cover layer and/or intermediate cover layer also comprise ionomer.

The inner, intermediate and/or outer cover layers may contain at least one part by weight of a filler based upon 100 parts of resin composition. If filler is used, it preferably is included in an amount of at least 5 parts by weight based upon 100 parts by weight of resin composition. The filler preferably is selected from the group consisting of precipitated hydrated silica, clay, talc, asbestos, glass, aramid fibers, mica, calcium metasilicate, barium sulfate, zinc sulfide, lithopone, silicon carbide, silicates, diatomaceous earth, carbonates, metals, metal alloys, metal oxides, metal stearates, particulate carbonaceous materials, cotton flock, cellulose flock, leather fiber, micro balloons and combinations thereof.

In one form of the invention, at least one of the inner cover layer and intermediate cover layer comprises a non-ionomeric polyolefin material. This material preferably includes at least one member selected from the group consisting of low density polyethylene, linear low density polyethylene, high density polyethylene, polypropylene, rubber-toughened olefin polymers, acid copolymers which do not become part of an ionomeric copolymer, plastomers including metallocene catalyzed polyolefins, flexomers, styrene/butadiene/styrene, block copolymers, styrene/ethylene-butylene/styrene block copolymers, dynamically vulcanized elastomers, ethylene vinyl acetates, ethylene methyl acrylates, polyvinyl chloride resins, polyamides, amide-ester elastomers, graft copolymers of ionomer and polyamide, crosslinked transpolyisoprene blends, thermoplastic block polyesters, thermoplastic polyurethanes and thermosetting polyurethanes.

A further preferred form of the invention is a golf ball comprising a solid core, an inner cover layer, an intermediate cover layer and an outer cover layer. The inner cover layer comprises at least one member selected from the group consisting of ionomers, thermoplastic elastomers and non-ionomeric polyolefins. The intermediate cover layer comprises at least one member selected from the group consisting of ionomers, thermoplastic elastomers and non-ionomeric polyolefins. The outer cover layer comprises at least one member selected from the group consisting of ionomers, thermoplastic elastomers and non-ionomeric polyolefins and preferably comprises an ionomer. Each of the inner cover layer, the intermediate cover layer and the outer cover layer is a separate and distinct layer.

In the golf ball of the invention,.at least one of the inner cover layer and the intermediate cover layer can be foamed. Furthermore, the outer cover layer can be foamed as long as molding does not result in unacceptable surface imperfections on the ball.

The invention accordingly comprises the several steps and the relation of one or more of such steps with respect to each of the others and the article possessing the features, properties, and the relation of elements exemplified in the following detailed disclosure.

DETAILED DESCRIPTION OF THE INVENTION

The golf ball according to the invention has a central core and a thick cover which includes at least three separate and distinct layers. The inner cover layer preferably is formed from a thermoplastic material. The intermediate cover layer also preferably is formed from a thermoplastic material. The outer cover layer preferably is formed from a thermoplastic material and more preferably is ionomeric.

"Separate and distinct" layers are layers with a different Shore D hardness than any adjacent layer and in which each layer is chemically distinguishable from any adjacent layer. Moreover, if a layer is foamed giving rise to a solid skin surface and cellular inner structure, this is still deemed a single layer and the hardness is defined as that of the unfoamed, solid material comprising that layer.

In a first preferred embodiment of the invention, the inner and outer cover layers are hard and the intermediate cover layer is softer than the inner and outer cover layers. This type of construction results in a golf ball having relatively low spin rates for good distance and accuracy, and a relatively soft feel, the soft intermediate layer providing added flexibility to an otherwise very rigid cover.

In a second preferred embodiment, the inner and outer cover layers are soft and the intermediate cover layer is harder than the inner and outer cover layers. This type of golf ball is useful when high spin on short iron shots, but lower spin on tee shots is desired. This. construction also gives the softest compression for a very soft feel.

In a third preferred embodiment, the inner cover layer is hard, the outer cover layer is soft, and the intermediate cover layer has an intermediate hardness. This construction is useful to form a golf ball having very high spin rates for maximizing the ability of a golfer to stop a ball precisely, minimizing roll.

In a fourth preferred embodiment, the inner cover layer is soft, the outer cover layer is hard, and the intermediate cover layer has intermediate hardness. This embodiment is useful when a good balance of relatively low spin, yet soft feel is desirable.

In a preferred form of the invention, the Shore D hardness of each cover layer is at least 3 points, and even more preferably is at least 5 points different than the Shore D hardness of each adjacent cover layer.

Figure 1:
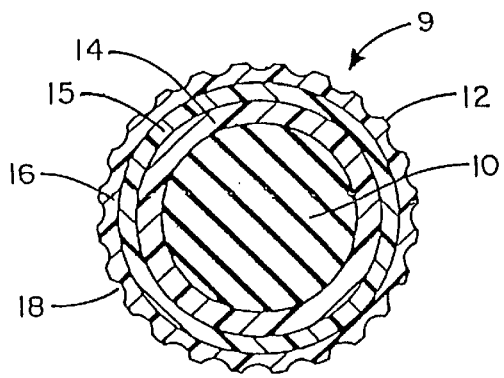
FIG. 1 shows a cross-sectional view of a first embodiment of a golf ball according to the invention.

Referring now to FIG. 1, a golf ball according to a first embodiment of the invention is shown and is designated as 9. The ball preferably has a diameter of at least 1.68 inches. The invention is particularly useful with golf balls having a diameter of 1.70 inches or more.

The golf ball 9 includes a central solid core 10 and a multi-layer cover 12. The multi-layer cover includes an inner cover layer 14, an intermediate cover layer 15, and an outer cover layer 16 with dimples 18. The inner cover layer 14 has a Shore D hardness[1] in the range of 60–80, and more preferably 62–80. The intermediate cover layer 15 has a Shore D hardness in the range of 10–55 and more preferably 30–50. The inner and intermediate cover layers preferably are formed from ionomeric or non-ionomeric polyolefin material. The outer cover layer 16 preferably comprises ionomer and has a Shore D hardness in the range of 60–80.

[1] As used herein, "Shore D hardness" of a cover is measured generally in accordance with ASTM D-2240, except the, measurements are made on the curved surface of a molded cover, rather than on a plaque. Furthermore, the Shore D hardness of the cover is measured while the cover remains over the core. When a hardness measurement is made on a dimpled cover, Shore D hardness is measured at a land area of the dimpled cover. The Shore D hardness of the inner cover layer is measured before the intermediate and outer cover layers have been formed on the ball or after they have been removed. The Shore D hardness of the intermediate cover layer is measured before the outer cover layer has been formed on the ball or after it has been removed.

Figure 2:
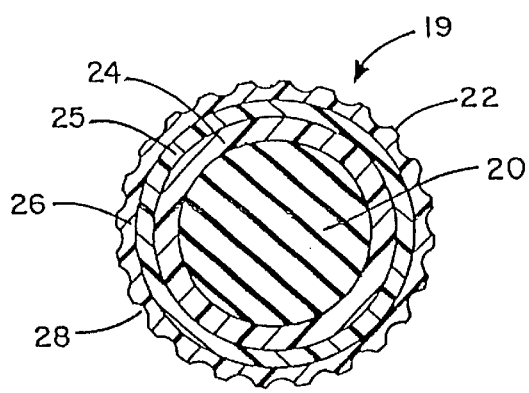
FIG. 2 shows a cross-sectional view of a second embodiment of a golf ball according to the invention.

Referring to FIG. 2, a golf ball according to a second embodiment of the invention is shown and is designated as 19. The ball preferably has a diameter of at least 1.68 inches. The ball includes a central solid core 20 and a multi-layer cover 22. The multi-layer cover includes a soft inner cover layer 24 having a Shore D hardness in the range of 10–55 and more preferably 30–50, a hard intermediate cover layer 25 having a Shore D hardness in the range of 60–80, and more preferably 62–80, and a soft outer cover layer 26 with dimples 28, the soft outer cover layer 26 having a Shore D hardness in the range of 10–55 and more preferably 30–50. The inner and intermediate cover layers preferably are formed from an ionomeric or non-ionomeric polyolefin material. The outer cover layer preferably comprises ionomer.

Figure 3:
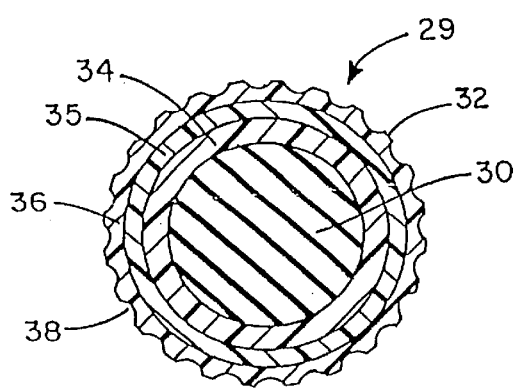
FIG. 3 shows a cross-sectional view of a third embodiment of a golf ball according to the invention.

Referring now to FIG. 3, a third embodiment of a golf ball according to the invention is designated as 29. The golf ball includes a central solid core 30 and a multi-layer cover 32. The multi-layer cover includes a hard inner cover layer 34 having a Shore D hardness of 60–80, and more preferably 62–80, an intermediate cover layer 35 having a Shore D hardness of 50–65, and an outer cover layer 36 with dimples 38. The outer cover layer has a Shore D hardness of 10–55 and more preferably 30–50. The inner cover layer 34 and intermediate cover layer 35 preferably comprise an ionomeric or non-ionomeric polyolefin material. The outer cover layer 36 preferably comprises ionomer.

Figure 4:
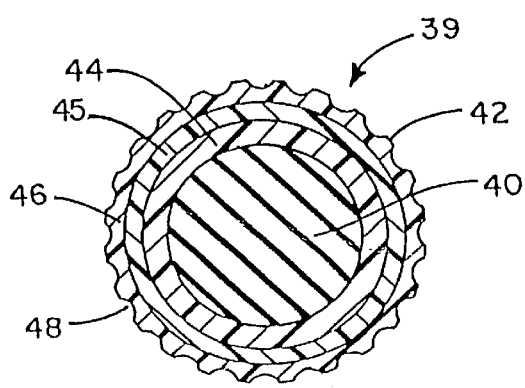
FIG. 4 shows a cross-sectional view of a fourth embodiment of a golf ball according to the invention.

Referring now to FIG. 4, a golf ball according to a fourth embodiment of the invention is shown and is designated as 39. The ball includes a central solid core 40 and a multi-layer cover 42. The multi-layer cover includes an inner cover layer 44 with a Shore D hardness of 10–55 and more preferably 30–50, an intermediate cover layer 45 with a Shore D hardness of 50–65, and an outer cover layer 46 with dimples 48. The outer cover layer has a Shore D hardness of 60–80, and more preferably 62–80. The inner and intermediate cover layers 44 and 45 preferably comprise an ionomeric or non-ionomeric polyolefin material. The outer cover layer 46 preferably comprises ionomer.

Figure 5:
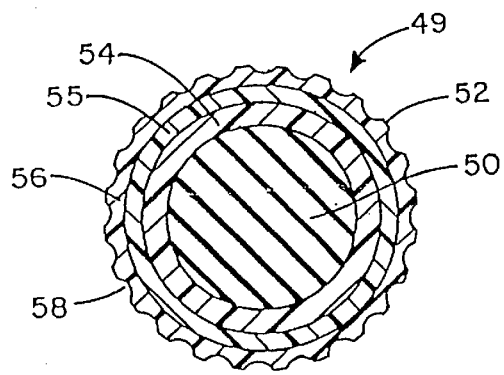
FIG. 5 shows a cross-sectional view of a fifth embodiment of a golf ball according to the invention.

Referring now to FIG. 5, a golf ball according to a fifth embodiment of the invention is shown and is designated as 49. The ball includes a central solid core 50 and a multi-layer cover 52. The multi-layer cover includes an inner cover layer 54 with a Shore D hardness of 60–80, and more preferably 62–80, an intermediate cover layer 55 with a Shore D hardness, of 10–55 and more preferably 30–50, and an outer cover layer 56 with dimples 58. The outer cover layer has a Shore D hardness of 50–65. The inner and intermediate cover layers 54 and 55 preferably comprise an ionomeric or non-ionomeric polyolefin material. The outer cover layer 56 preferably comprises ionomer.

Figure 6:
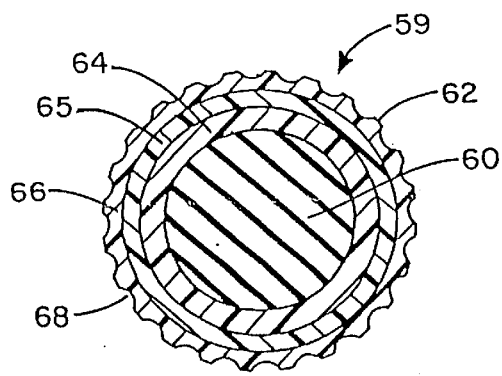
FIG. 6 shows a cross-sectional view of a sixth embodiment of a golf ball according to the invention.

Referring now to FIG. 6, a golf ball according to a sixth embodiment of the invention is shown and is designated as 59. The ball includes a central solid core 60 and a multi-layer cover 62. The multi-layer cover includes an inner cover layer 64 with a Shore D hardness of 50–65, an intermediate cover layer 65 with a Shore D hardness of 10–55 and more preferably 30–50, and an outer cover layer 66 with dimples 68. The outer cover layer has a Shore D hardness of 60–80, and more preferably 62–80. The inner and intermediate cover layers 64 and 65 preferably comprise an ionomeric or non-ionomeric polyolefin material. The outer cover layer 66 preferably comprises ionomer.

Figure 7:
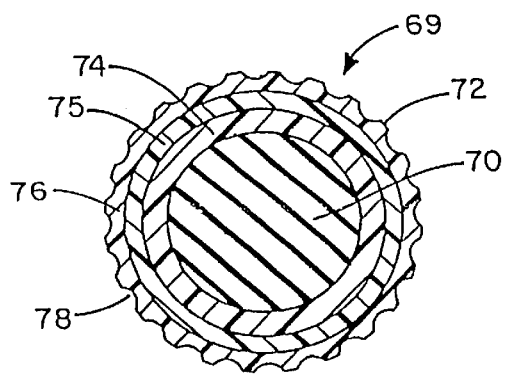
FIG. 7 shows a cross-sectional view of a seventh embodiment of a golf ball according to the invention.

Referring now to FIG. 7, a golf ball according to a seventh embodiment of the invention is shown and is designated as 69. The ball includes a central solid core 70 and a multi-layer cover 72. The multi-layer cover includes an inner cover layer 74 with a Shore D hardness of 10–55 and more preferably 30–50, an intermediate cover layer 75 with a Shore D hardness of 60–80, and more preferably 62–80, and an outer cover layer 76 with dimples 78. The outer cover layer has a Shore D hardness of 50–65. The inner and intermediate cover layers 74 and 75 preferably comprise an ionomeric or non-ionomeric polyolefin material. The outer cover layer 76 preferably comprises ionomer.

Figure 8:
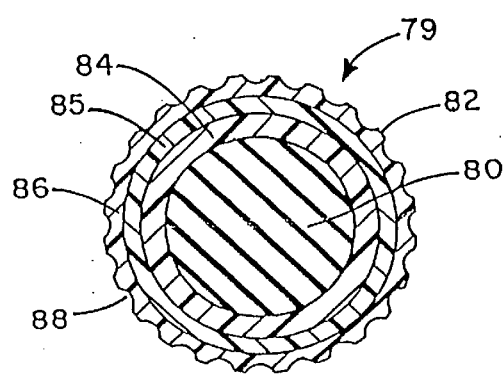
FIG. 8 shows a cross-sectional view of an eighth embodiment of a golf ball according to the invention.

Referring now to FIG. 8, a golf ball according to an eighth embodiment of the invention is shown and is designated as 79. The ball includes a central solid core 80 and a multi-layer cover 82. The multi-layer cover includes an inner cover layer 84 with a Shore D hardness of 50–65, an intermediate cover layer 85 with a Shore D hardness of 60–80 and more preferably 62–80, and an outer cover layer 86 with dimples 88. The outer cover layer has a Shore D hardness of 10–55 and more preferably 30–50. The inner and intermediate cover layers 84 and 85 preferably comprise an ionomeric or non-ionomeric polyolefin material. The outer cover layer 86 preferably comprises ionomer.

For each of the embodiments shown in FIGS. 1–8, each cover layer preferably has a Shore D hardness which is at least 3 points, and more preferably at least 5 points, harder or softer than the Shore D hardness of each adjacent cover layer. Preferably each layer has a different chemical composition than each adjacent cover layer.

As indicated above, the cover layers preferably are formed from ionomer. In a preferred form of the invention, soft cover layers, i.e. those with a Shore D hardness of 10–55 and more preferably 30–50, comprise an ionomer with an average wt % acid content of about 15 or less which is at least 10% neutralized. More specifically, the soft cover layers typically constitute a blend of two types of ionomers in which one component of the blend is an ethylene-acrylic acid or ethylene-methacrylic acid copolymer containing $\geq 15$ wt % acid groups which are at least partially neutralized with a cation, and the other type of ionomer is a terpolymer of ethylene, acrylic acid or methacrylic acid and a softening termonomer such as butyl acrylate or methyl acrylate, resulting in an overall wt % acid content of about 15 or less. Non-limiting examples of suitable blends are described in U.S. Pat. Nos. 4,884,814 and 5,120,791, both of which are incorporated herein by reference. In a particularly preferred form of the invention the soft cover layer is comprised of $\geq 75$ wt % terpolymer type ionomer.

The cover layers of intermediate hardness, e.g., those with a Shore D hardness of 50–65, preferably are made from the same types of materials as are used for the soft cover layers. It is particularly preferred to use blends of about 25–75 wt % copolymer ionomer with about 75–25 wt % terpolymer type ionomers.

The hard ionomeric cover layer or layers can contain a single type of ionomer or a blend of two or more types of ionomers. Furthermore, a hardening and/or softening modi fier can be added. In a particularly preferred form of the invention, the hard cover layer or layers contain one or more ionomers having at least 16 weight % acid groups, which are at least partially neutralized.

Each of the three cover layers can be foamed or unfoamed. Preferably, each layer is unfoamed. A foamed layer has a lower density than an unfoamed layer, thereby affecting the weight distribution and moment of inertia. Typically, the melt index is increased by foaming. The use of a foamed cover layer results in the need to increase the weight of the core of the ball, thereby allowing for easier initiation of spin to a ball, particularly on short shots. This may partially compensate for a low spin rate on a hard covered ball, particularly in the case of a player who does not strike the ball at a fast swing speed. A foamed layer generally has a lower modulus and thus increased flexibility. Typically, a foamed layer is formed by adding a small amount of a chemical blowing agent to the cover material prior to molding. The blowing agent is selected such that it will release gas at the molding temperature for the cover layer.

Non-limiting examples of materials which are suitable to form the outer cover layer of the golf ball are ionomer, a metallocene catalyzed polyolefin such as EXACT, INSITE, AFFINITY, or ENGAGE which preferably is crosslinked, polyamides, amide-ester elastomer, or graft copolymer of ionomer and polyamide such as CAPRON, ZYTEL, ZYTEL FN, PEBAX, etc., a crosslinked transpolyisoprene blend, a thermoplastic block polyester such as HYTREL, or a thermoplastic or thermosetting polyurethane, such as Estane® polyurethanes, including Estane® X-4517.

The inner and intermediate cover layers can be made of any of the materials listed in the previous paragraph as being useful for forming an outer cover layer. Furthermore, the inner and intermediate cover layers can be formed from a number of other non-ionomeric thermoplastics and thermosets. For example, lower cost polyolefins and thermoplastic elastomers can be used. Non-limiting examples of suitable non-ionomeric polyolefin materials include low density polyethylene, linear low density polyethylene, high density polyethylene, polypropylene, rubber-toughened olefin polymers, acid copolymers which do not become part of an ionomeric copolymer when used in the inner cover layer, such as PRIMACOR, NUCREL, ESCOR and ATX, plastomers and flexomers, thermoplastic elastomers such as styrene/butadiene/styrene (SBS) or styrene/ethylene-butylene/styrene (SEBS) block copolymers, including Kraton® (Shell), dynamically vulcanized elastomers such as Santoprene® (Monsanto), ethylene vinyl acetates such as Elvax® (DuPont), ethylene methyl acrylates such as Optema® (Exxon), polyvinyl chloride resins, and other elastomeric materials may be used. Mixtures, blends, or alloys involving the materials described above can be used. It is desirable that the polyolefin be a tough, low density material. The non-ionomeric polyolefins can be mixed with ionomers.

The inner, intermediate and outer cover layers optionally may include processing aids, release agents and/or diluents. Another useful material for the inner and/or intermediate cover layers is a natural rubber latex (prevulcanized) which has a tensile strength of 4,000–5,000 psi, high resilience, good scuff resistance, a Shore D hardness of less than and an elongation of >500%.

As indicated above, the inner, intermediate and outer cover layers may contain plastomer. The plastomer preferably either is crosslinked or is blended with an ionomer or other compatible material. Plastomers are olefin copolymers with a uniform, narrow molecular weight distribution, a high comonomer content, and an even distribution of comonomers. The molecular weight distribution of the plastomers generally is about 1.5–4, preferably 1.5–3.5 and more preferably 1.5–2.4. The density is typically in the range of 0.85–0.97 if unfoamed and 0.10–0.90 if foamed. The comonomer content typically is in the range of 1–32%, and preferably 2–20%. The composition distribution breadth index generally is greater than 30%, preferably is at least 45%, and more preferably is at least 50%.

The term "copolymer" includes (1) copolymers having two types of monomers which are polymerized together, (2) terpolymers (which are formed by the polymerization of three types of monomers), and (3) copolymers which are formed by the polymerization of more than three types of monomers. The compositions further may include additives and fillers as well as a co-agent for use with a curing agent to aid in crosslinking the plastomer or to improve processability.

The "composition distribution breadth index" (CDBI) is defined as the weight percent of the copolymer molecules which have a comonomer content within 50 percent of the median total molar comonomer content.

Plastomers are polyolefin copolymers developed using metallocene single-site catalyst technology. Plastomers exhibit both thermoplastic and elastomeric characteristics. Plastomers generally contain up to about 32 wt % comonomer. Plastomers which are useful in making golf balls include but are not limited to ethylene-butene copolymers, ethylene-octene copolymers, ethylene-hexene copolymers, and ethylene-hexene-butene terpolymers, as well as mixtures thereof.

The plastomers employed in the invention preferably are formed by a single-site metallocene catalyst such as those disclosed in EP 29368, U.S. Pat. No. 4,752,597, U.S. Pat. No. 4,808,561, and U.S. Pat. No. 4,937,299, the teachings of which are incorporated herein by reference. As is known in the art, plastomers can be produced by metallocene catalysis using a high pressure process by polymerizing ethylene in combination with other monomers such as butene-1, hexene-1, octene-1 and 4-methyl-1-pentene in the presence of catalyst system comprising a cyclopentadienyl-transition metal compound and an alumoxane.

EXACT™ plastomers (Exxon Chemical Co., Houston, Tex.) are metallocene-catalyzed polyolefins. This family of plastomers has a density of 0.87–0.915 g/cc, melting points in the range of 140–220° F., Shore D hardness in the range of 20–50 (measured generally in accordance with ASTM D-2240, but measured on the curved surface of the inner cover layer), flexural modulus in the range of 2–15 k.p.s.i., tensile strength of 1600–4000 p.s.i., excellent thermal stability, and very good elastic recovery. One of these materials, known as EXACT™ 4049, is a butene copolymer with a comonomer content of less than 28% and a polymer density of 0.873 g/cc. The properties of EXACT™ 4049 are shown on Table 1 below:

TABLE 1

| Polymer Properties | Typical Values[1] | ASTM Method |
| --- | --- | --- |
| Melt flow index | 4.5 dg/min | D-1238 (E) |
| Density | 0.873 g/cm$^3$ | D-792 |
| Elastomer Properties[2] | | |
| Hardness | 72 Shore A | D-2240 |
|  | 20 Shore D |  |
| Ultimate Tensile[3], Die D | 900 p.s.i. (6.4 MPa) | D-412 |
| Tensile Modulus |  | D-412 |

TABLE 1-continued

| Polymer Properties | Typical Values[1] | ASTM Method |
|---|---|---|
| @ 100% elongation | 280 p.s.i. (2 MPa) | |
| @ 300% elongation | 350 p.s.i. (2.4 MPa) | |
| Ultimate Elongation | 2000% | D-412 |
| Brittleness Temperature | ←112° F. (←80° C.) | D-746 |
| Vicat Softening Point, 200 g | 130° F. (55° C.) | D-1525 |
| Mooney Viscosity (1 + 4 @ 125° C.) | 6.5 Torque Units | D-1646 |

[1]Values are typical and are not to be interpreted as specifications.
[2]Compression molded specimens.
[3]Tensile properties determined using a type D die & a crosshead speed of 20 in/min.

This material has been found to be particularly useful in forming the inner cover layer 14.

Other non-limiting examples of EXACT plastomers which are useful in the invention include linear ethylene-butene copolymers such as EXACT 3024 having a density of about 0.905 gms/cc (ASTM D-1505) and a melt flow index of about 4.5 g/10 min. (ASTM D-2839); EXACT 3025 having a density of about 0.910 gms/cc (ASTM D-1505) and a melt flow index of about 1.2 g/10 min. (ASTM D-2839); EXACT 3027 having a density of about 0.900 gms/cc (ASTM D-1505) and a melt flow index of about 3.5 g/10 min. (ASTM D-2839); and EXACT 4011 having a density of about 0.887 gms/cc (ASTM D-1505) and a melt flow index of about 2.2 g/10 min. (ASTM D-2839); and ethylene-hexene copolymers such as EXACT 3031 having a density of about 0.900 gms/cc (ASTM D-1505) and a melt flow index of about 3.5 g/10 min. (ASTM D-2839). Other non-limiting examples of useful EXACT plastomers are EXACT 4005 and EXACT 5010. Terpolymers of e.g. ethylene, butene and hexene also can be used. All of the above EXACT series plastomers are available from EXXON Chemical Co. Similar materials sold by Dow Chemical Co. as INSITE® technology under the AFFINITY® and ENGAGE® trademarks also can be used.

EXACT plastomers typically have a molecular weight distribution ($M_w/M_n$) of about 1.5. to 2.4, where $M_w$ is weight average molecular weight and $M_n$ is number average molecular weight, a molecular weight of about 5,000 to about 50,000, preferably about 20,000 to about 30,000, and a melt flow index above about 0.50 g/10 mins, preferably about 1–10 g/10 mins as determined by ASTM D-1238, condition E. Plastomers which may be employed in the invention include copolymers of ethylene and at least one $C_3$–$C_{20}$ α-olefin, preferably a $C_4$–$C_8$ α-olefin present in an amount of about 5 to about 32 mole %, preferably about 7 to about 22 mole %, more preferably about 9–18 mole %. These plastomers are believed to have a composition distribution breadth index of about 45% or more.

Plastomers such as those sold by Dow Chemical Co. under the tradename ENGAGE are believed to be produced in accordance with U.S. Pat. No. 5,272,236, the teachings of which are incorporated herein in their entirety by reference. These plastomers are substantially linear polymers having a density of about 0.85 gms/cc to about 0.97 g/cc measured in accordance with ASTM D-792, a melt flow index ("MI") of about 0.01 gms/10 minutes to about 1000 grams/10 minutes, a melt flow ratio ($I_{10}/I_2$) of about 7 to about 20, where $I_{10}$ is measured in accordance with ASTM D-1238 (190/10) and $I_2$ is measured in accordance with ASTM D-1238 (190/2.16), and a molecular weight distribution $M_w/M_n$ which preferably is less than 5, and more preferably is less than about 3.5 and most preferably is from about 1.5 to about 2.5. These plastomers include homopolymers of $C_2$–$C_{20}$ olefins such as ethylene, propylene, 4-methyl-1-pentene, and the like, or they can be interpolymers of ethylene with at least one $C_3$–$C_{20}$ α-olefin and/or $C_2$–$C_{20}$ acetylenically unsaturated monomer and/or $C_4$–$C_{18}$ diolefins. These plastomers generally have a polymer backbone that is either unsubstituted or substituted with up to 3 long chain branches/1000 carbons. As used herein, long chain branching means a chain length of at least about 6 carbons, above which the length cannot be distinguished using $^{13}C$ nuclear magnetic resonance spectroscopy. The preferred ENGAGE plastomers are characterized by a saturated ethylene-octene backbone, a narrow molecular weight distribution $M_w/M_n$ of about 2, and a narrow level of crystallinity. These plastomers also are compatible with pigments, brightening agents, fillers such as those described above, as well as with plasticizers such as paraffinic process oil and naphthenic process oil. Other commercially available plastomers may be useful in the invention, including those manufactured by Mitsui.

The molecular weight distribution, ($M_w/M_n$), of plastomers made in accordance with U.S. Pat. No. 5,272,236 most preferably is about 2.0. Non-limiting examples of these plastomers include ENGAGE CL 8001 having a density of about 0.868 gms/cc, a melt flow index of about 0.5 g/10 mins, and a Shore A hardness of about 75; ENGAGE CL 8002 having a density of about 0.87 gms/cc, a melt flow index of about 1 gms/10 min, Shore A hardness of about 75; ENGAGE CL 8003 having a density of about 0.885 gms/cc, a melt flow index of about 1.0 gms/10 min, and a Shore A hardness of about 86; ENGAGE EG 8100 having a density of about 0.87 gms/cc, a melt flow index of about 1 gms/10 min., and a Shore A hardness of about 87; ENGAGE 8150 having a density of about 0.868 gms/cc, a melt flow index of about 0.5 gms/10 min, and a Shore A hardness of about 75; ENGAGE 8200 having a density of about 0.87 gms/cc, a melt flow index of about 5 g/10 min., and a Shore A hardness of about 75; and ENGAGE EP 8500 having a density of about 0.87 gms/cc, a melt flow index of about 5 g/10 min., and a Shore A hardness of about 75.

In a particularly preferred form of the invention, at least one of the inner, intermediate and outer cover layers contains at least one part by weight of a filler based upon 100 parts by weight of the resin composition. The filler preferably is used to adjust the density, flex modulus, mold release, and/or melt flow index of the cover layer. More preferably, at least when the filler is for adjustment of density or flex modulus, it is present in an amount of at least five parts by weight based upon 100 parts by weight of the resin composition. With some fillers, up to about 200 parts by weight probably can be used.

A density adjusting filler according to the invention preferably is a filler which has a specific gravity which is at least 0.05 higher or lower and more preferably at least 0.1 higher or lower than the specific gravity of the resin composition. Particularly preferred density adjusting fillers have specific gravities which are higher than the specific gravity of the resin composition by 0.2 or more, even more preferably by 2.0 or more.

A flex modulus adjusting filler according to the invention is a filler which, when used in an amount of e.g. 1–100 parts by weight based upon 100 parts by weight of resin composition, will raise or lower the flex modulus (ASTM D-790) of the resin composition by at least 1% and preferably at least 5% as compared to the flex modulus of the resin composition without the inclusion of the flex modulus adjusting filler.

A mold release adjusting filter is a filler which allows for easier removal of part from mold, and eliminates or reduces the need for external release agents which otherwise could be applied to the mold. A mold release adjusting filler typically is used in an amount of up to about 2 wt % based upon the total weight of the cover layer.

A melt flow index adjusting filler is a filler which increases or decreases the melt flow, or ease of processing of the composition.

The cover layers and core may contain coupling agents that increase adhesion of materials within a particular layer e.g. to couple a filler to a resin composition, or between adjacent layers. Non-limiting examples of coupling agents include titanates, zirconates and silanes. Coupling agents typically are used in amounts of 0.1–2 wt % based upon the total weight of the composition in which the coupling agent is included.

A density adjusting filler is used to control the moment of inertia, and thus the initial spin rate of the ball and spin decay. The addition in one or more of the cover layers, and particularly in the outer cover layer, of a filler with a lower specific gravity than the resin composition results in a decrease in moment of inertia and a higher initial spin rate than would result if no filler were used. The addition in one or more of the cover layers, and particularly in the outer cover layer, of a filler with a higher specific gravity than the resin composition results in an increase in moment of inertia and a lower initial spin rate. High specific gravity fillers are preferred as less volume is used to achieve the desired inner cover total weight. Nonreinforcing fillers are also preferred as they have minimal effect on COR. Preferably, the filler does not chemically react with the resin composition to a substantial degree, although some reaction may occur when, for example, zinc oxide is used in a cover layer which contains some ionomer.

The density-increasing fillers for use in the invention preferably have a specific gravity in the range of 1.0–20. The density-reducing fillers for use in the invention preferably have a specific gravity of 0.06–1.4, and more preferably 0.06–0.90. The flex modulus increasing fillers have a reinforcing or stiffening effect due to their morphology, their interaction with the resin, or their inherent physical properties. The flex modulus reducing fillers have an opposite effect due to their relatively flexible properties compared to the matrix resin. The melt flow index increasing fillers have a flow enhancing effect due to their relatively high melt flow versus the matrix. The melt flow index decreasing fillers have an opposite effect due to their relatively low melt flow index versus the matrix.

Fillers which may be employed in the inner, intermediate and outer cover layers may be or are typically in a finely divided form, for example, in a size generally less than about 20 mesh, preferably less than about 100 mesh U.S. standard size, except for fibers and flock, which are generally elongated. Flock and fiber sizes should be small enough to facilitate processing. Filler particle size will depend upon desired effect, cost, ease of addition, and dusting considerations. The filler preferably is selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro balloons, and combinations thereof. Non-limiting examples of suitable fillers, their densities, and their preferred uses are as follows:

TABLE 2

| Filler Type | Spec. Grav. | Comments |
|---|---|---|
| Precipitated hydrated silica | 2.0 | 1, 2 |
| Clay | 2.62 | 1, 2 |
| Talc | 2.85 | 1, 2 |
| Asbestos | 2.5 | 1, 2 |
| Glass fibers | 2.55 | 1, 2 |
| Aramid fibers (KEVLAR ®) | 1.44 | 1, 2 |
| Mica | 2.8 | 1, 2 |
| Calcium metasilicate | 2.9 | 1, 2 |
| Barium sulfate | 4.6 | 1, 2 |
| Zinc sulfide | 4.1 | 1, 2 |
| Lithopone | 4.2–4.3 | 1, 2 |
| Silicates | 2.1 | 1, 2 |
| Silicon carbide platelets | 3.18 | 1, 2 |
| Silicon carbide whiskers | 3.2 | 1, 2 |
| Tungsten carbide | 15.6 | 1 |
| Diatomaceous earth | 2.3 | 1, 2 |
| Polyvinyl chloride | 1.41 | 1, 2 |
| Carbonates | | |
| Calcium carbonate | 2.71 | 1, 2 |
| Magnesium carbonate | 2.20 | 1, 2 |
| Metals and Alloys (powders) | | |
| Titanium | 4.51 | 1 |
| Tungsten | 19.35 | 1 |
| Aluminum | 2.70 | 1 |
| Bismuth | 9.78 | 1 |
| Nickel | 8.90 | 1 |
| Molybdenum | 10.2 | 1 |
| Iron | 7.86 | 1 |
| Steel | 7.8–7.9 | 1 |
| Lead | 11.4 | 1, 2 |
| Copper | 8.94 | 1 |
| Brass | 8.2–8.4 | 1 |
| Boron | 2.34 | 1 |
| Boron carbide whiskers | 2.52 | 1, 2 |
| Bronze | 8.70–8.74 | 1 |
| Cobalt | 8.92 | 1 |
| Beryllium | 1.84 | 1 |
| Zinc | 7.14 | 1 |
| Tin | 7.31 | 1 |
| Metal Oxides | | |
| Zinc oxide | 5.57 | 1, 2 |
| Iron oxide | 5.1 | 1, 2 |
| Aluminum oxide | 4.0 | |
| Titanium oxide | 3.9–4.1 | 1, 2 |
| Magnesium oxide | 3.3–3.5 | 1, 2 |
| Zirconium oxide | 5.73 | 1, 2 |
| Metal Stearates | | |
| Zinc stearate | 1.09 | 3, 4 |
| Calcium stearate | 1.03 | 3, 4 |
| Barium stearate | 1.23 | 3, 4 |
| Lithium stearate | 1.01 | 3, 4 |
| Magnesium stearate | 1.03 | 3, 4 |
| Particulate carbonaceous materials | | |
| Graphite | 1.5–1.8 | 1, 2 |
| Carbon black | 1.8 | 1, 2 |
| Natural bitumen | 1.2–1.4 | 1, 2 |
| Cotton flock | 1.3–1.4 | 1, 2 |
| Cellulose flock | 1.15–1.5 | 1, 2 |
| Leather fiber | 1.2–1.4 | 1, 2 |
| Micro balloons | | |
| Glass | 0.15–1.1 | 1, 2 |
| Ceramic | 0.2–0.7 | 1, 2 |
| Fly ash | 0.6–0.8 | 1, 2 |
| Coupling Agents Adhesion Promoters | | |
| Titanates | 0.95–1.17 | |
| Zirconates | 0.92–1.11 | |
| Silane | 0.95–1.2 | |

COMMENTS:
1 Particularly useful for adjusting density of the cover layer.

TABLE 2-continued

| Filler Type | Spec. Grav. | Comments |
|---|---|---|

2 Particularly useful for adjusting flex modulus of the cover layer.
3 Particularly useful for adjusting mold release of the cover layer.
4 Particularly useful for increasing melt flow index of the cover layer.
All fillers except for metal stearates would be expected to reduce the melt flow index of the cover layer.

The amount of filler employed is primarily a function of weight requirements and distribution.

Two principal properties involved in golf ball performance are resilience and PGA compression. The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration (i.e., dimple pattern and area of dimple coverage) as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. The factors or determinants of particular interest with respect to improved distance are generally the coefficient of restitution (COR), launch angle, spin, and the surface configuration (dimple pattern, ratio of land area to dimple area, etc.) of the ball.

The COR in solid core balls is a function of the composition of the core and of the cover. The core and/or cover may be comprised of one or more layers such as in multi-layered balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, the center and cover of a wound core ball may also consist of one or more layers.

The coefficient of restitution is the ratio of the outgoing velocity to the incoming velocity. In the examples of this application, the coefficient of restitution of a golf ball was measured by propelling a ball horizontally at a speed of 125±5 feet per second (fps) and corrected to 125 fps against a generally vertical, hard, flat steel plate and measuring the ball's incoming and outgoing velocity electronically. Speeds were measured with a pair of Oehler Mark 55 ballistic screens available from Oehler Research, Inc., P.O. Box 9135, Austin, Tex. 78766, which provide a timing pulse when an object passes through them. The screens were separated by 36" and are located 25.25" and 61.25" from the rebound wall. The ball speed was measured by timing the pulses from screen 1 to screen 2 on the way into the rebound wall (as the average speed of the ball over 36"), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel 2.0 inches thick.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The coefficient of restitution must be carefully controlled in all commercial golf balls if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75° F. when tested on a U.S.G.A. machine. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

PGA compression is another important property involved in the performance of a golf ball. The compression of the ball can affect the playability of the ball on striking and the sound or "click" produced. Similarly, compression can effect the "feel" of the ball (i.e., hard or soft responsive feel), particularly in chipping and putting.

Moreover, while compression itself has little bearing on the distance performance of a ball, compression can affect the playability of the ball on striking. The degree of compression of a ball against the club face and the softness of the cover strongly influences the resultant spin rate. Typically, a softer cover will produce a higher spin rate than a harder cover. Additionally, a harder core will produce a higher spin rate than a softer core. This is because at impact a hard core serves to compress the cover of the ball against the face of the club to a much greater degree than a soft core thereby resulting in more "grab" of the ball on the clubface and subsequent higher spin rates. In effect the cover is squeezed between the relatively incompressible core and clubhead. When a softer core is used, the cover is under much less compressive stress than when a harder core is used and therefore does not contact the clubface as intimately. This results in lower spin rates.

The term "compression" utilized in the golf ball trade generally defines the overall deflection that a golf ball undergoes when subjected to a compressive load. For example, PGA compression indicates the amount of change in golf ball's shape upon striking. The development of solid core technology in two-piece balls has allowed for much more precise control of compression in comparison to thread wound three-piece balls. This is because in the manufacture of solid core balls, the amount of deflection or deformation is precisely controlled by the chemical formula used in making the cores. This differs from wound three-piece balls wherein compression is controlled in part by the winding process of the elastic thread. Thus, two-piece and multilayer solid core balls exhibit much more consistent compression readings than balls having wound cores such as the thread wound three-piece balls.

In the past, PGA compression related to a scale of from 0 to 200 given to a golf ball. The lower the PGA compression value, the softer the feel of the ball upon striking. In practice, tournament quality balls have compression ratings around 70–110, preferably around 80 to 100.

In determining PGA compression using the 0–200 scale, a standard force is applied to the external surface of the ball. A ball which exhibits no deflection (0.0 inches in deflection) is rated 200 and a ball which deflects 2/10th of an inch (0.2 inches) is rated 0. Every change of 0.001 of an inch in deflection represents a 1 point drop in compression.

Consequently, a ball which deflects 0.1 inches (100×0.001 inches) has a PGA compression value of 100 (i.e., 200–100) and a ball which deflects 0.110 inches (110×0.001 inches) has a PGA compression of 90 (i.e., 200–110).

In order to assist in the determination of compression, several devices have been employed by the industry. For example, PGA compression is determined by an apparatus fashioned in the form of a small press with an upper and lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches.

An example to determine PGA compression can be shown by utilizing a golf ball compression tester produced by Atti Engineering Corporation of Newark, N.J. The value obtained by this tester relates to an arbitrary value expressed by a number which may range from 0 to 100, although a value of 200 can be measured as indicated by two revolutions of the dial indicator on the apparatus. The value obtained defines the deflection that a golf ball undergoes when subjected to compressive loading. The Atti test apparatus consists of a lower movable platform and an upper movable spring-loaded anvil. The dial indicator is mounted such that it measures the upward movement of the spring-loaded anvil. The golf ball to be tested is placed in the lower platform, which is then raised a fixed distance. The upper portion of the golf ball comes in contact with and exerts a pressure on the springloaded anvil. Depending upon the distance of the golf ball to be compressed, the upper anvil is forced upward against the spring.

Alternative devices have also been employed to determine compression. For example, Applicant also utilizes a modified Riehle Compression Machine originally produced by Riehle Bros. Testing Machine Company, Phil., Pa. to evaluate compression of the various components (i.e., cores, mantle cover balls, finished balls, etc.) of the golf balls. The Riehle compression device determines deformation in thousandths of an inch under a fixed initialized load of 200 pounds. Using such a device, a Riehle compression of 61 corresponds to a deflection under load of 0.061 inches.

Additionally, an approximate relationship between Riehle compression and PGA compression exists for balls of the same size. It has been determined by Applicant that Riehle compression corresponds to PGA compression by the general formula PGA compression =160–Riehle compression. Consequently, 80 Riehle compression corresponds to 80 PGA compression, 70 Riehle compression corresponds to 90 PGA compression, and 60 Riehle compression corresponds to 100 PGA compression. For reporting purposes, Applicant's compression values are usually measured as Riehle compression and converted to PGA compression.

Furthermore, additional compression devices may also be utilized to monitor golf ball compression so long as the correlation to PGA compression is know. These devices have been designed, such as a Whitney Tester, to correlate or correspond to PGA compression through a set relationship or formula.

The hardness of the cover layers of the golf balls of the invention, and the compositions and thicknesses of these layers are appropriate to result in a golf ball having a COR of at least 0.700, more preferably at least 0.740 and most preferably at least 0.750. The golf ball of the invention has an overall PGA compression of 40–110, more preferably 50–100, and most preferably 60–90.

The inner, intermediate and outer layers together form a cover having a thickness of 0.03–0.50 inches, more preferably about 0.050–0.30 inches, and most preferably about 0.10–0.20 inches. The inner and intermediate cover layers each have a thickness of 0.01–0.20 inches, and preferably 0.025–0.15 inches. The outer cover layer has a thickness of 0.01–0.20 inches, preferably 0.02–0.20 inches in order to accommodate dimples with a depth up to about 0.015 inches, and more preferably 0.025–0.15 inches. In a particularly preferred embodiment, at least one cover layer has a thickness of 0.04–0.10 inches. The ratio of the diameter of the ball to the thickness of the cover, i.e. the sum of the thickness of the inner cover layer, intermediate cover layer and outer cover layer, is no more than about 20:1, preferably no more than about 17:1 and more preferably no more than about 15:1.

The core of the golf ball preferably is made of a crosslinked unsaturated elastomer and preferably comprises a thermoset rubber such as polybutadiene or another diene-containing rubber, but also can be made of other core materials which provide sufficient COR. For example, the core can be wound, or can be a non-wound single or multi-layer core containing a solid thermoplastic or thermoset ionomeric or non-ionomeric polyolefin, polyurethane, polyamide, polyester, dynamically vulcanized rubber, etc., or blend thereof. The diameter of the core is determined based upon the desired overall ball diameter, minus the combined thicknesses of the inner, intermediate and outer cover layers. The COR of the core is appropriate to impart to the finished golf ball a COR of at least 0.700, and preferably at least 0.750. The core typically, but not necessarily, has a diameter of about 0.80–1.62 inches, preferably 1.2–1.6 inches, a PGA compression of 10–90, more preferably 20–80 and most preferably 20–70. The golf ball preferably has a COR in the range of 0.600–0.850.

Conventional solid cores are typically compression molded from a slug of uncured or lightly cured elastomer composition comprising a high cis content polybutadiene and a metal salt of an $\alpha$, $\beta$, ethylenically unsaturated carboxylic acid such as zinc mono or diacrylate or methacrylate. To achieve higher coefficients of restitution in the core, the manufacturer may include fillers such as small amounts of a metal oxide such as zinc oxide. In addition, larger amounts of metal oxide than those that are needed to achieve the desired coefficient are often included in conventional cores in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiators such as peroxides are admixed with the core composition so that on the application of heat and pressure, a complex curing cross-linking reaction takes place.

The cover layers can be formed over the cores by injection molding, compression molding, casting or other conventional molding techniques, or by vacuum forming, spraying, dipping, etc. Each layer preferably is separately formed. It is preferable to form each layer by either injection molding or compression molding. A more preferred method of making the golf ball of the invention is to successively injection mold in three separate molds. First, the inner cover layer is injection molded over the core in a smooth cavity mold, subsequently the intermediate cover layer is injection molded over the inner cover layer in a smooth cavity mold, and finally the outer cover layer is injection molded over the intermediate cover layer in a dimpled cavity mold.

As indicated above, soft cover layers have a Shore D hardness in the range of 10–55 and preferably 30–50 when the hardness is measured on the curved surface of a molded cover. In a particularly preferred embodiment of the invention the soft cover layer or layers have a Shore D hardness in the range of 40–50. To form one preferred embodiment of a soft cover layer for use as an inner, intermediate or outer cover layer, one or more low modulus ionomers (i.e., soft ionomers), or a blend of one or more high modulus ionomers (i.e., hard ionomers) and one or more low modulus ionomers (i.e., soft ionomers) in a mixture can be used. A high modulus ionomer is one which has a flexural modulus of about 15,000–120,000 psi or more as measured under ASTM method D-790. The hardness of this type of ionomer is at least 50 on the Shore D scale as measured on a plaque, rather than on a ball, in accordance with ASTM method D-2240. Typically, hard ionomers are copolymers with two types of monomers. A low modulus ionomer which can be blended with the high modulus ionomer to form the inner layer has a flexural modulus of about 1,000 to about 15,000 psi (ASTM D-790), and a hardness as measured on a plaque of about 10–40 on the Shore D scale (ASTM D-2240). Typically, soft ionomers are terpolymers.

To form a cover layer of intermediate hardness, hard and soft cover materials typically are blended in a ratio of 25–75 wt % hard (copolymer) ionomer and 75–25 wt % soft (terpolymer type) ionomer. Alternatively, cover layers of intermediate hardness as well as soft cover layers can be comprised of a single ionomer having a hardness that meets the requirements of Shore D hardness, i.e., a Shore D hardness of 10–55 for a soft cover layer and 50–65 for a cover layer of intermediate hardness.

To form a hard cover layer, one or more hard (high modulus) ionomers are used. Furthermore, low modulus ionomers can be blended with the high modulus ionomer or ionomers to improve compressing, toughness at low temperatures, enhanced feel, scuff resistance, etc., as long as the Shore D hardness requirements for the hard cover layer are met.

The hard ionomer resins include ionic copolymers which are the e.g. sodium, zinc, magnesium, calcium, manganese, nickel, potassium or lithium, etc. salt, or blend thereof, of the reaction product of an olefin having from 2 to 8 carbon atoms and an unsaturated monocarboxylic acid having from 3 to 8 carbon atoms and which result in a ball having the desired combination of COR, compression, and inner cover layer hardness. The carboxylic acid groups of the copolymer are partially neutralized by the metal ions, i.e., about 10–100%, typically about 10–75% and more preferably about 30–70% neutralized. The hard ionomeric resins typically are copolymers of ethylene with acrylic and/or methacrylic acid. Two or more hard ionomer resins can be blended.

The metal cation salts utilized in the invention are those salts which provide the metal cations capable of neutralizing, to various extents, the carboxylic acid groups of the high acid copolymer. These include acetate, oxide or hydroxide salts of e.g. lithium, calcium, zinc, sodium, potassium, nickel, magnesium, arid manganese, etc.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide and magnesium acetate. Sources of manganese include manganese acetate and manganese oxide.

Non-limiting examples of commercially available hard ionomeric resins with intermediate acid levels which can be used in a blend to form the cover layers include the hard sodium ionic copolymer sold under the trademark Surlyn®8940 and the hard zinc ionic copolymer sold under the trademark Surlyn®9910. Surlyn®8940 is a copolymer of ethylene with methacrylic acid with about 15 weight % acid which is about 29% neutralized with sodium ions. This resin has an average melt flow index of about 2.8. Surlyn®9910 is a copolymer of ethylene and methacrylic acid with about 15 weight % acid which is about 58% neutralized with zinc ions. The average melt flow index of Surlyn®9910 is about 0.7. Additional examples include Iotek 1002, Iotek 1003, Iotek 8000, Iotek 8020, Iotek 8030, Iotek 7010 and Iotek 7030 which are sold by Exxon Corporation. Non-limiting examples of ionomeric resins with intermediate acid levels are shown below on Table 3.

Hard cover layers and other cover layers containing hard-soft blends also can be made using high acid ionomer resins. High acid ionomer resins preferably contain more than 16% by weight of a carboxylic acid, preferably 17–25% by weight of a carboxylic acid, and most preferably about 18.5–21.5% by weight of a carboxylic acid. Examples of a number of copolymers suitable for use to produce the high acid ionomers include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 30 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene. Examples of commercially available high acid methacrylic acid-based ionomers which can be used in accordance with the invention include Surlyn® AD-8422 (sodium cation), Surlyn® 8162 (zinc cation), Surlyn® SEP-503-1 (zinc cation), and Surlyn® SEP-503-2 (magnesium cation). According to DuPont, all of these ionomers contain from about 18.5 to about 21% by weight methacrylic acid.

A cover layer with a particular Shore D hardness can be formed using a single ionomer, or more commonly, a blend of two or more ionomers. Non-limiting examples of ionomers which can be used to form golf ball covers are as follows:

TABLE 3

Typical Properties of Some Commercially Available Hard Surlyn ® Resins

|  |  | ASTM D | 8940 | 9910 | 8920 | 8528 | 9970 | 9730 |
|---|---|---|---|---|---|---|---|---|
| Cation type |  |  | Sodium | Zinc | Sodium | Sodium | Zinc | Zinc |
| Melt flow index, gms/10 min. |  | D-1238 | 2.8 | 0.7 | 0.9 | 1.3 | 14.0 | 1.8 |
| Specific gravity, g/cm$^3$ |  | D-792 | 0.95 | 0.97 | 0.95 | 0.94 | 0.95 | 0.95 |
| Hardness, Shore D |  | D-2240 | 65 | 64 | 66 | 60 | 62 | 63 |
| Tensile strength, | (kpsi) | D-638 | (4.8) | (3.6) | (5.4) | (4.2) | (3.2) | (4.1) |
|  | MPa |  | 33.1 | 24.8 | 37.2 | 29.0 | 22.1 | 28.3 |
| Elongation, % |  | D-638 | 470 | 290 | 350 | 450 | 460 | 460 |
| Flexural Modulus, | (kpsi) | D-790 | (51) | (48) | (55) | (32) | (28) | (30) |
|  | MPa |  | 350 | 330 | 380 | 220 | 190 | 210 |
| Tensile Impact (23° C.), | KJ/m$^2$ | D-1822S | 1020 | 1020 | 865 | 1160 | 760 | 1240 |
|  | (ft. – lbs./in$^2$) |  | (485) | (485) | (410) | (550) | (360) | (590) |
| Vicat Temperature, ° C. |  | D-1525 | 63 | 62 | 58 | 73 | 61 | 73 |

TABLE 4

Properties of Additional Hard Surlyn ® Resins

| IONOMER |  | SURLYN ® 8920 | SURLYN ® 8140 | SURLYN ® 9120 |
|---|---|---|---|---|
| Cation |  | Na | Na | Zn |
| Melt Flow Index | gms/10 min. | 0.9 | 2.6 | 1.3 |
| MP | ° C. | 84 | 88 | 85 |
| FP | ° C. | 52 | 49 | 50 |
| Tensile Strength | kpsi | 5.4 | 5.0 | 3.8 |
| Yield Strength | kpsi | 2.2 | 2.8 | 2.4 |
| Elongation | % | 350 | 340 | 280 |
| Flex Modulus | kpsi | 55 | 71 | 64 |
| Shore D Hardness |  | 66 | 70 | 69 |

TABLE 5

Typical Properties of Iotek Ionomers

| Resin Properties | ASTM Method | Units | 7010 | 7020 | 7030 | 8000 | 8020 | 8030 |
|---|---|---|---|---|---|---|---|---|
| Cation type |  |  | zinc | zinc | zinc | sodium | sodium | sodium |
| Melt Index | D-1238 | g/10 min | 0.8 | 1.5 | 2.5 | 0.8 | 1.6 | 2.8 |
| Density | D-1505 | kg/m$^3$ | 968 | 966 | 964 | 957 | 956 | 956 |
| Melting Point | D-3417 | ° C. | 83.5 | 84 | 85 | 83 | 84 | 87 |
| Crystallization Point | D-3417 | ° C. | 55 | 56 | 58 | 45 | 47 | 49 |
| Vicat Softening Point | D-1525 | ° C. | 60 | 60 | 60 | 54 | 54.5 | 55.5 |
| Tensile strength at break | D-638 | MPa | 24.5 | 23.5 | 22.6 | 33 | 32.5 | 32 |
| Yield strength | D-638 | MPa | 14 | 13 | 12 | 19 | 18.5 | 18 |
| Elongation at break | D-638 | % | 440 | 450 | 460 | 370 | 380 | 410 |
| 1% Secant modulus | D-638 | MPa | 150 | 135 | 125 | 280 | 280 | 280 |
| Shore Hardness D | D-2240 | — | 54 | 53 | 52 | 60 | 60 | 60 |
| Flex modulus (3 mm) | D-790 | MPa | 190 | 175 | 155 | 320 | 340 | 355 |

TABLE 6

Examples of Exxon High Molecular Weight Ionomers

| PROPERTY | Ex 1005 | Ex 1006 | Ex 1007 | Ex 1008 | Ex 1009 | 7310 |
|---|---|---|---|---|---|---|
| Melt Index, g/10 min. | 0.7 | 1.3 | 1.0 | 1.4 | 0.8 | 1.0 |
| Cation | Na | Na | Zn | Zn | Na | Zn |
| Melting Point, ° C. | 85.3 | 86 | 85.8 | 86 | 91.3 | 91 |
| Vicat Softening Point, ° C. | 54 | 57 | 60.5 | 60 | 56 | 69 |
| Tensile @ Break, MPa | 33.9 | 33.5 | 24.1 | 23.6 | 32.4 | 24 |
| Elongation @ Break, % | 403 | 421 | 472 | 427 | 473 | 520 |
| Hardness, Shore D | 58 | 58 | 51 | 50 | 56 | 52 |
| Flexural Modulus, MPa | 289 | 290 | 152 | 141 | 282 | 150 |

TABLE 7

Exxon High Acid Ionomers

| Property | Ex 1001 | Ex 1002 | ESCOR® (IOTEK) 959 | Ex 1003 | Ex 1004 | ESCOR® (IOTEK) 960 |
|---|---|---|---|---|---|---|
| Melt Index, g/10 min. | 1.0 | 1.6 | 2.1 | 1.1 | 2.0 | 1.8 |
| Cation | Na | Na | Na | Zn | Zn | Zn |
| Melting Point, °C. | 83.7 | 83.7 | — | 82 | 82.5 | 79 |
| Vicat Softening Point, °C. | 51.5 | 51.5 | 58 | 56 | 55 | 55 |
| Tensile @ Break | 34.4 MPa | 31.7 MPa | 34 MPa | 24.8 MPa | 20.6 MPa | 24 MPa |
| Elongation @ Break, % | 341 | 348 | 280 | 387 | 437 | 430 |
| Hardness, Shore D | 63 | 62 | 65 | 54 | 53 | 57 |
| Flexural Modulus | 365 MPa | 380 MPa | 480 MPa | 147 MPa | 130 MPa | 170 MPa |

TABLE 8

Additional Exxon High Acid Ionomers

| Property | Unit | EX 989 | EX 993 | EX 994 | EX 990 |
|---|---|---|---|---|---|
| Melt Index | g/10 min. | 1.30 | 1.25 | 1.32 | 1.24 |
| Moisture | ppm | 482 | 214 | 997 | 654 |
| Cation Type | — | Na | Li | K | Zn |
| M+ content by AAS | wt % | 2.74 | 0.87 | 4.54 | 0 |
| Zn content by AAS | wt % | 0 | 0 | 0 | 3.16 |
| Density | kg/m$^3$ | 959 | 945 | 976 | 977 |
| Vicat softening point | °C. | 52.5 | 51 | 50 | 55.0 |
| Crystallization point | °C. | 40.1 | 39.8 | 44.9 | 54.4 |
| Melting point | °C. | 82.6 | 81.0 | 80.4 | 81.0 |
| Tensile at yield | MPa | 23.8 | 24.6 | 22 | 16.5 |
| Tensile at break | MPa | 32.3 | 31.1 | 29.7 | 23.8 |
| Elongation at break | % | 330 | 260 | 340 | 357 |
| 1% secant modulus | MPa | 389 | 379 | 312 | 205 |
| Flexural modulus | MPa | 340 | 368 | 303 | 183 |
| Abrasion resistance | mg | 20.0 | 9.2 | 15.2 | 20.5 |
| Hardness Shore D | — | 62 | 62.5 | 61 | 56 |
| Zwick Rebound | % | 61 | 63 | 59 | 48 |

TABLE 9

Zinc-Based Iotek Terpolymer Ionomers

| Property | Unit | IOTEK 7520 | IOTEK 7510 |
|---|---|---|---|
| Melt Index | g/10 min. | 2.0 | 0.8 |
| Density | g/cc | 0.96 | 0.97 |
| Melting Point | °F. | 151 | 149 |
| Vicat Softening Point | °F. | 108 | 109 |
| Flex Modulus | psi | 3800 | 5300 |
| Tensile Strength | psi | 1450 | 1750 |
| Elongation | % | 760 | 690 |
| Hardness, Shore D | — | 32 | 35 |

As indicated above, ionomers which contain softening comonomers, such as ionomeric terpolymers, can be included in the cover layers. Non-limiting examples of a softening comonomer include vinyl esters of aliphatic carboxylic acids wherein the acids have 2 to 10 carbon atoms, vinyl ethers wherein the alkyl group contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Non-limiting examples of soft ionomers to be blended with the above-described hard ionomers to form the cover layers of the inventive golf bail comprise sodium, zinc, magnesium, calcium, manganese, nickel, potassium or lithium, etc. salts of a terpolymer of an olefin having from about 2 to 8 carbon atoms, acrylic acid or methacrylic acid, and a softening comonomer which is an unsaturated monomer of the acrylate ester class having from 1 to 21 carbon atoms. The soft ionomer is preferably an ionomer made from an acrylic acid-based polymer and an unsaturated monomer of the acrylate ester class. The soft ionomers typically have an acid content of 3–12 wt % (including the weight percent of the softening comonomer).

It has been determined that when hard-soft ionomer blends are used for cover layers, good results are achieved when the relative combination is in a range of about 90 to about 10 wt % hard ionomer and about 10 to about 90 wt % soft ionomer. For cover layers which are soft or of intermediate hardness, results are improved by adjusting the range to about 75 to 25 wt % hard ionomer and 25 to 75 wt % soft ionomer. Even better results are noted at relative ranges of about 60 to 40 wt % hard ionomer resin and about 40 to 60 wt % soft ionomer resin. For hard cover layers, the wt % of soft ionomer preferably will not exceed about 25 wt %.

As indicated above, the cover layers optionally may include hardening or softening modifiers, non-limiting examples of which include a metal stearate, such as zinc stearate, or another fatty acid salt, as described in commonly assigned U.S. Pat. Nos. 5,306,760 and 5,312,857. One purpose of the metal stearate or other fatty acid salt is to reduce the cost of production of the ball without affecting overall performance of the finished ball. Furthermore, polar-group modified rubbers can be blended with ionomers as described, for example, in commonly assigned U.S. Pat. Nos. 4,986,545, 5,098,105, 5,187,013, 5,330,837 and 5,338,610. Thermoplastic elastomers which act as hardening or softening agents, including polyurethane, a polyester elastomer such as that sold by DuPont as HYTREL®, a polyester polyurethane such as B.F. Goodrich Company's ESTANE® polyester polyurethane X-4517, and a polyester amide such as that sold by Elf Atochem S. A. under the name PEBAX®, can be added. A plastomer such as that sold by Exxon under the name EXACT™, e.g., EXACT™ 4049 can be included. Various plasticizers and processing aids also can be used.

The golf balls of the present invention typically are coated with a thin, glossy, protective topcoat of polyurethane, epoxy, or another suitable topcoat material. The topcoat generally has a thickness in the range of 0.0005 to 0.005 inches, and more preferably 0.001 to 0.002 inches. To provide for good adhesion of the top coat on the outer cover layer, a primer coat typically is included between the outer cover layer and top coat. This primer coat generally also is made of polyurethane or epoxy, and typically has a thickness after curing of 0.0001 to 0.0015 inches, and more preferably 0.00025–0.001 inches.

When the golf ball of the invention has more than three cover layers, the inner cover layer as defined in this application can be formed from two or more layers which, taken together, meet the requirements of hardness and thickness of the layer or layers which are defined herein as the inner cover layer. Similarly, the intermediate cover layer can be formed from two or more layers which, taken together, meet the requirements of hardness and thickness of the layer or layers which are defined herein as the intermediate cover layer. The outer cover layer can be formed from two or more layers which, taken together, meet the requirements of hardness and thickness of the layer or layers which are defined herein as the outer cover layer. Furthermore, one or more additional, thin ionomeric or non-ionomeric layers can be added on either side of the inner cover layer and intermediate cover layer as long as the objectives of the invention are achieved.

Having generally described the invention, the following examples are included for purposes of illustration so that the invention may be more readily understood and are in no way intended to limit the scope of the invention unless otherwise specifically indicated.

EXAMPLE 1

A number of golf ball cores were formed using the core formulation shown below:

| Material | Parts by Weight |
| --- | --- |
| First polybutadiene[2] | 70 |
| Second polybutadiene[3] | 30 |
| Zinc oxide[4] | 43 |
| Regrind[5] | 20 |
| Zinc diacrylate[5] | 20 |
| Zinc stearate[7] | 15 |
| Peroxide[8] | 0.9 |

[2]Cariflex BR-1220, Meuhlstein, Norwalk, CT
[3]Taktene 220, Bayer Corp., Akron, OH
[4]Zinc Corp. of America, Monaca, PA
[5]Golf ball core regrind (internal source)
[6]Rockland React Rite, Rockland, CA
[7]Synpro, Cleveland, OH
[8]Luperco 231 XL, R. T. Vanderbilt, Norwalk, CT The formulation was used to make a number of 1.38 inch cores using compression molding and curing at 320° F. for 5–20 minutes. The cores were molded to a size of 1.38 inches using 1.40 inch cavities in the MTS form.

Hemispheres for the inner cover layer were formed by injection molding. The inner cover layers were compression molded over the core using 1.50 inch compression molding cavities. The compression molding cycle was five minutes at 320° F. followed by nine minutes of cooling at 600 psi.

An intermediate cover layer was injection molded over the inner cover layer using a 1.57 inch smooth cavity injection mold.

An outer cover layer was injection molded over the intermediate cover layer for each ball using a six cavity mold to form golf balls having a final ball size of 1.68 inches. The balls were finished using conventional finishing techniques. The properties of the golf balls and formulations for the covers are shown below on Table 10.

EXAMPLES 2–4

The procedure of Example 1 was repeated using different combinations of cover layers at the same cover layer thicknesses. The results are shown on Table 10.

COMPARATIVE EXAMPLES A–B

A golf ball core was formed having the properties shown below on Table 3. The core had a diameter of 1.47 inches. An inner cover layer of ionomer was injection molded over the core, followed by an outer cover layer of ionomer, which also was injection molded. The ionomeric compositions of the inner cover layer and outer cover layer are shown on Table 10.

Two additional types of golf balls with double covers were formed. The properties and composition of the two additional types of golf balls is shown on Table 10.

COMPARATIVE EXAMPLE C

A golf ball core was formed having the properties shown below. A single cover layer was injection molded over the core. The composition of the cover, along with the properties of the resulting ball, are shown on Table 10.

The three cover layer balls of Examples 1–4 provide for a favorable balance of spin and feel characteristics. Looking at Examples 1 and 2 in conjunction with Comparative Example A, it is noted that the balls of Comparative Example A have inferior feel and softness as compared to the balls of Examples 1 and 2, as is evidenced by the higher PGA compression of the balls of Comparative Example A as compared to the balls of Examples 1 and 2. While the ball of Comparative Example B has a reasonably good combination of spin and feel, the ball of Example 3 is preferred when somewhat lower spin is desired. The lower spin of the ball of Example 3 may offer longer roll upon landing and better stability in windy conditions, with the ball being less likely to upshoot. The balls of Example 4 have higher spin than those of Comparative Example B, which may be desirable to a player with a slow or intermediate swing speed who desires sufficient backspin to stop a golf ball on a green, for example. A high spin golf ball such as that of Example 4 also is useful for a player who would like high spin on short shots. Thus, the golf balls of Example 4 are superior to those of Comparative Example B when very high spin is desired. The ball of Comparative Example C has excessively high spin on all shots, and therefore would not provide good distance on drives and would not be useful to result in "variable spin properties" such as high spin on short shots and low spin on long shots.

As will be apparent to persons skilled in the art, various modifications and adaptations of the structure above described will become readily apparent without departure from the spirit and scope of the invention, the scope of which is defined in the appended claims.

TABLE 10

|  | Ex. 1 | Ex. 2 | Ex. 3 | Ex. 4 | Comp. A | Comp. B | Comp. C |
|---|---|---|---|---|---|---|---|
| Core |  |  |  |  |  |  |  |
| Size | 1.38 | 1.38 | 1.38 | 1.38 | 1.47 | 1.47 | 1.545 |
| Weight | 28 | 28 | 28 | 28 | 32.9 | 32.9 | 36.7 |
| PGA Comp | 55 | 55 | 55 | 55 | 54 | 54 | 73 |
| COR | 756 | 756 | 756 | 756 | 762 | 762 | 778 |
| Shore C/D | 80/49 | 80/49 | 80/49 | 80/49 | 78/47 | 78/47 | 81/47 |
| Inner Mantle |  |  |  |  |  |  | None |
| Materials | pph | pph | pph | pph | pph | pph |  |
| Iotek 7002 | — | 50 | — | 50 | 50 | 50 | — |
| Iotek 1003 | — | 50 | — | 50 | 50 | 50 | — |
| Iotek 7510 | 50 | — | 50 | — | — | — | — |
| Iotek 7520 | 50 | — | 50 | — | — | — | — |
| Size | 1.47 | 1.47 | 1.47 | 1.47 | 1.57 | 1.57 | — |
| Thickness | 0.045 | 0.045 | 0.045 | 0.045 | 0.050 | 0.050 | — |
| Weight | 33.5 | 33.5 | 33.5 | 33.5 | 38.4 | 38.4 | — |
| PGA Comp | 54 | 75 | 54 | 75 | 78 | 78 | — |
| COR | 750 | 790 | 750 | 790 | 795 | 795 | — |
| Shore C/D | 70/47 | 97/71 | 70/47 | 97/71 | 97/71 | 97/71 | — |
| Intermediate Mantle |  |  |  |  | None | None | None |
| Materials | pph | pph | pph | pph |  |  |  |
| Iotek 1002 | 25 | — | 50 | 25 | — | — | — |
| Iotek 1003 | 25 | — | 50 | 25 | — | — | — |
| Iotek 7510 | 25 | 50 | — | 25 | — | — | — |
| Iotek 7520 | 25 | 50 | — | 25 | — | — | — |
| Size | 1.57 | 1.57 | 1.57 | 1.57 | — | — | — |
| Thickness | 0.050 | 0.050 | 0.050 | 0.050 | — | — | — |
| Weight | 38.6 | 38.7 | 38.6 | 38.6 | — | — | — |
| PGA Comp | 66 | 81 | 72 | 86 | — | — | — |
| COR | 753 | 774 | 773 | 780 | — | — | — |
| Shore C/D | 82/58 | 70/47 | 97/71 | 62/56 | — | — | — |
| Finished Ball |  |  |  |  |  |  |  |
| Cover Materials | pph | pph | pph | pph | pph | pph | pph |
| Iotek 1002 | 45.3 | 45.3 | — | — | 45.3 | — | — |
| Iotek 1003 | 45.3 | 45.3 | — | — | 45.3 | — | — |
| Iotek 7510 | — | — | 45.3 | 45.3 | — | 45.3 | 45.3 |
| Iotek 7520 | — | — | 45.3 | 45.3 | — | 45.3 | 45.3 |
| TG MB | 9.4 | 9.4 | 9.4 | 9.4 | 9.4 | 9.4 | 9.4 |
| Thickness | 0.055 | 0.055 | 0.055 | 0.055 | 0.055 | 0.055 | 0.070 |
| Weight | 46 | 46 | 46.1 | 46 | 46.2 | 46.2 | 45.8 |
| PGA Comp | 85 | 95 | 78 | 90 | 99 | 82 | 79 |
| COR | 779 | 789 | 762 | 768 | 817 | 777 | 772 |
| Shore C/D | 97/71 | 97/71 | 70/47 | 70/47 | 97/71 | 70/47 | 70/47 |
| Spin*1 | 7857 | 7568 | 9028 | 10018 | 7957 | 9278 | 10309 |
| Spin Std. Dev. | 504 | 614 | 298 | 376 | 607 | 129 | 216 |

*1 - Spin test - TF 9 iron at 105 fps, Strata Tour 90 control > 9029 (200 Std. Dev.), Titleist Tour Balata 100 > 9495 (238 Std. Dev.)

What is claimed is:

1. A golf ball, comprising:

a solid or wound core, and a multi-layer cover having at least three separate and distinct layers, said multi-layer cover comprising an inner cover layer formed around the core, an intermediate cover layer formed around the inner cover layer, and an outer cover layer formed around the intermediate cover layer, the intermediate layer having a Shore D hardness softer than the outer cover layer and harder than the inner cover layer.

2. A golf ball according to claim 1, wherein the outer cover layer has a Shore D hardness in the range of 60–80.

3. A golf ball according to claim 1, wherein the intermediate cover layer has a Shore D hardness in the range of 50–65.

4. A golf ball according to claim 1, wherein the outer cover layer has a Shore D hardness in the range of 62–80.

5. A golf ball according to claim 1 wherein each cover layer has a different Shore D hardness than each adjacent cover layer.

6. A golf ball according to claim 1 wherein each cover layer is at least 3 Shore D hardness points different than each adjacent cover layer.

7. A golf ball according to claim 1 wherein the inner cover layer has a Shore D hardness in the range of 10 to 55.

8. A golf ball according to claim 1 wherein the inner cover layer has a Shore D hardness in the range of 30 to 50.

9. A golf ball according to claim 1 wherein the inner and intermediate cover layers are each comprised of a polyolefin material.

* * * * *